Patented Jan. 5, 1954

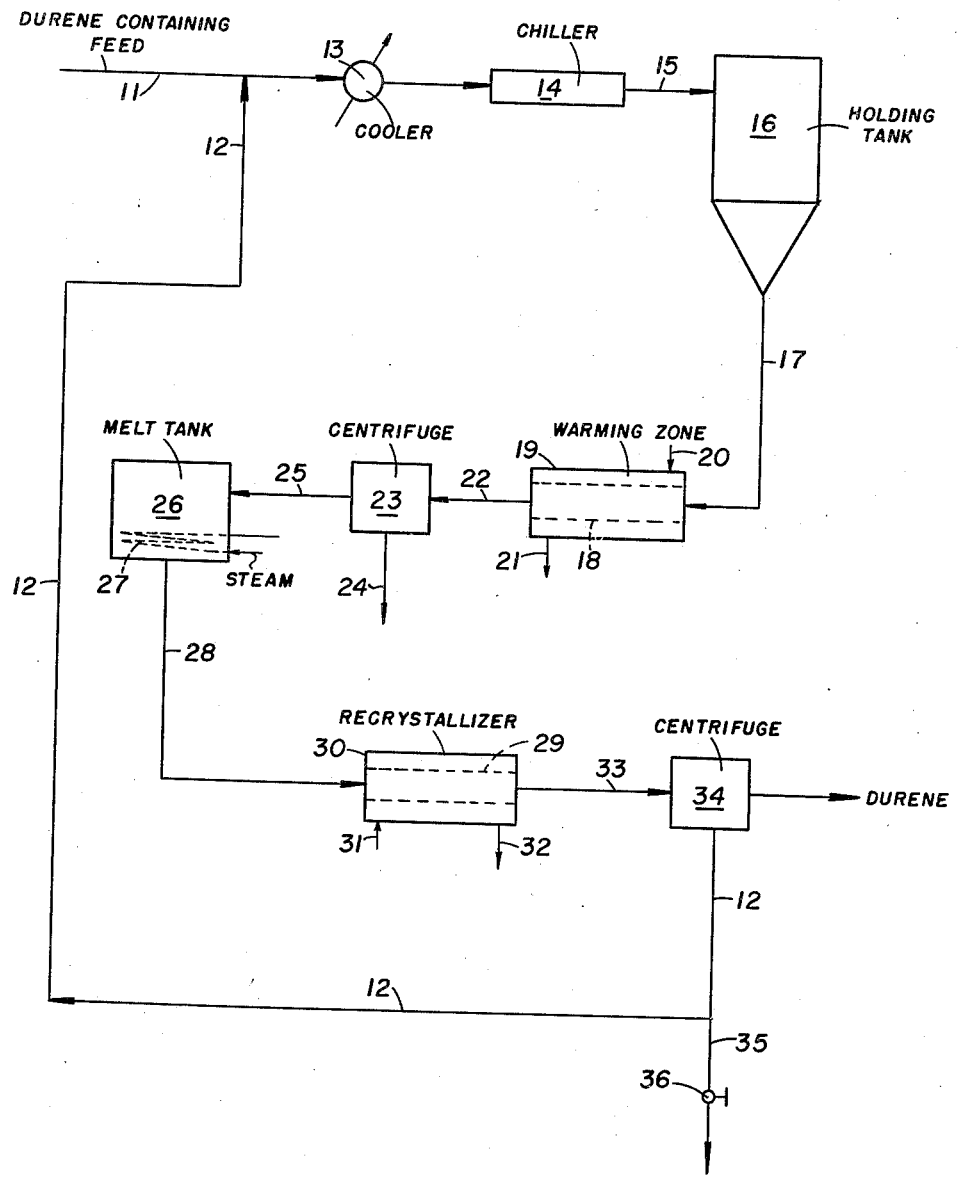

2,665,316

UNITED STATES PATENT OFFICE 2,665,316

RECOVERY OF DURENE

Rufus B. Bennett, Baytown, Tex., assignor, by mesne assignments, to Standard Oil Development Company, Elizabeth, N. J., a corporation of Delaware Application October 21, 1950, Serial No. 191,463

4 Claims. (Cl. 260—674)

The present invention is directed to the recovery of durene from aromatic hydrocarbon fractions containing the same. More particularly, the invention is directed to the recovery of substantially pure durene from aromatic hydrocarbon mixtures of it boiling in the range between 350° and 425° F.

In the practice of the present invention, an aromatic hydrocarbon feed boiling in the range from 350° to 425° F. containing a minor amount of durene is chilled to a temperature in the range from $-95°$ F. to $-105°$ F. over a period of time at least 4 hours to form a first slurry of durene crystals in a first mother liquor. The first slurry is then maintained or held at the temperature to which it is chilled for a time of at least 4 hours and then warmed to a temperature no greater than $-25°$ F. Thereafter the warmed slurry is subjected to a separation treatment, such as a centrifugation or filtration operation, whereby the durene crystals in the warmed slurry are separated from the mother liquor and formed into a cake; this cake contains a substantially greater concentration of durene than was contained in the feed and may contain from 50% to 70% by weight of durene. The cake is then subjected to a heating and melting operation following which the melted cake is cooled to a temperature in the range between $+80°$ and $+105°$ F. to form a second slurry of durene crystals in a second mother liquor. This second slurry is subjected to a separation treatment, such as filtration or centrifugation, to recover a second cake from which substantially pure durene crystals having a purity of 95% durene may be recovered.

The tetramethyl benzenes, of which durene is one, are three in number and have the following characteristics presented in Table I.

Table I

| | Melting point, °F. | Boiling point, °F. |
|---|---|---|
| Durene (1,2,4,5-tetramethyl-benzene) | 174.5 | 384.6 |
| Isodurene (1,2,3,5-tetramethyl benzene) | 11.3 | 388.4 |
| Prehnite (1,2,3,4-tetramethyl benzene) | 20.8 | 401 |

It will be seen that the melting points of the isomeric tetramethyl benzenes are widely separated but that the boiling points of the individual isomers are quite close to each other. However, durene behaves peculiarly and it is difficult to separate from isodurene and prehnitene even though there is a wide spread between the melting points. I have discovered that a two-stage process, in which a mixture containing durene is supercooled, warmed and then separated to recover durene crystals followed by a melting and cooling operation, results in the recovery of a product having a higher purity of durene than was obtainable by prior art methods. In short, the present invention is based on the control of a number of processing steps to achieve the desired result.

The invention will be described in more detail by reference to the drawing in which a preferred mode is described in the single figure.

Referring now to the drawing, a feed stock containing durene in a minor amount is charged into the system from a source not shown through line 11. Typical feed stocks employed in the practice of the present invention are illustrated in Table II.

Table II

| Analysis: | | | | |
|---|---|---|---|---|
| Durene, weight percent | 9.7 | 11.6 | 16.9 | 10.6 |
| Isodurene, weight percent | 12.2 | 13.6 | 22.0 | 12.4 |
| Naphthalene, weight percent | 0.0 | Trace | 0.0 | 2.0 |
| Aromatics, volume percent | 92 | 97 | 96 | 95 |
| Paraffins, volume percent | 8 | 3 | 4 | 5 |
| ASTM distillation: | | | | |
| I. B. P., °F | 357 | 366 | 363 | 366 |
| F. B. P., °F | 407 | 415 | 393 | 424 |
| Recovery, percent | 98.8 | 98.8 | 98.9 | 98.0 |
| Residue, percent | 1.0 | 1.0 | 0.9 | 1.0 |
| Loss, percent | 0.2 | 0.2 | 0.2 | 1.0 |

The durene-containing feed is admixed with a recycled stream which is introduced into line 11 by line 12 from a source which will be described further. The feed in line 11 is then cooled in a cooler 13 and then introduced into a chiller 14 which may be of the scraped surface type. The temperature of the durene feed is reduced to a temperature in the range from $-95°$ to $-105°$ F. over a period of time of at least 4 hours and which may be as high as 10 hours. 4 hours chilling time gives good results. While a scraped surface chiller may be employed, an Oslo crystallizer (such as described in Chemical Engineers Handbook, Perry, 3rd edition, McGraw-Hill Book Co., p. 1068 et seq.) may be used in lieu of the scraped surface chiller. After the feed mixture has been chilled to the desired temperature, it is discharged by line 15 into a holding tank 16 wherein it is maintained or held for a period of time in the range of about 4 to about 10 hours while maintaining the temperature at the desired low point in the range given before. After the durene has remained in holding tank 16 for the required time, it is discharged therefrom by line 17 into a warming zone 18 in which the temperature of the slurry is raised to a temperature in the range from −25° to −75° F. Warming zone 18 may be provided with a jacket 19 into which may be introduced by line 20 a suitable heating medium which may be withdrawn by line 21. It is understood, of course, that the feed mixture may be passed in heat exchange with the material introduced by line 17 by flowing the feed mixture through jacket 19 by lines 20 and 21.

The warming zone 18 may be of a type similar to a scraped surface chiller but when used as a warming zone the crystals adjacent the heated surface would be moved inwardly and admixed with the main body of chilled and supercooled crystals. The warming operation should be conducted over a period of time in the range from about 15 to 60 minutes with a preferred time of about 40 minutes to give best results.

The warmed slurry is discharged from warming zone 18 by line 22 and introduced into a separation zone 23 which may be a centrifuge of the basket type or may be a suitable filter. Assuming for the purpose of this description that separation zone 23 is a centrifuge of the basket type, the centrifuge is operated at a sufficient speed to impose on the slurry a force equivalent to 400 to 1000 times gravity. It has been found that operating centrifuge 23 at a rate to impose a force of 750 times gravity gives good results. Centrifuge 23 may be operated at this rate from 2 to 20 minutes with a preferred time of about 15 minutes. The mother liquor which is separated from the crystals is discharged from centrifuge 23 by line 24 while the durene crystals are withdrawn by line 25 and discharged thereby into a melting tank 26 which is provided with a steam coil or other heating means 27. In melting tank 26 the durene crystals are heated and melted at a temperature in the range between 110° and 150° F. Actually this temperature will depend on the purity of the cake discharged by line 25 from centrifuge 23. Usually this cake will contain from about 50% to about 70% by weight of durene. A cake containing 50% by weight of durene melts at 113° F.; one containing 61% by weight of durene melts at around 130° F.; and one containing about 70% by weight of durene melts at 147° F. The heated and melted cake then discharges from tank 26 by line 28 and is introduced thereby into a recrystallizer which may be a scraped surface chiller or an Oslo-type crystallizer 29 which is provided with a jacket 30 through which may be circulated by lines 31 and 32 a suitable cooling fluid. In recrystallizer 29 the temperature of the melted cake is reduced to a temperature in the range between 80° and 105° F. to form a second slurry and a second mother liquor. Very good results are obtained by recrystallizing at 100° F. The recrystallized material discharged from recrystallizer 29 by line 33 is introduced into a second separation zone 34 which may be a suitable centrifuge or filter but for purposes of this description is supposed to be a centrifuge. Centrifuge 34 may be operated at rates similar to centrifuge 23 for a time of at least 2 to 15 minutes with a preferred time of 5 minutes to form a cake of durene crystals therein from which a mother liquor is discharged. The durene cake formed in centrifuge 34 has a purity of 95% of durene or better and may be recovered from centrifuge 34 by line 35. The mother liquor is discharged by line 12 and is admixed with the feed in line 11 as has been described.

While the description taken with the drawing shows all of the mother liquor withdrawn from centrifuge 34 being recycled to line 11 it may be desirable under some conditions not to recycle all of this stream. When this happens a portion or all of the mother liquor discharged by line 12 may be withdrawn from the system by branch line 35 controlled by valve 36.

In order to illustrate the invention further, crystalline slurries from feeds such as illustrated in Table II, which have been formed by chilling to −100° F. in a scraped surface chiller for varying length of time, were centrifuged 15 minutes at 750 times gravity to form cakes of durene comprising small plate-like crystals. The data from these runs are presented in Table III.

Table III

| | | | | |
|---|---|---|---|---|
| Time to reach −100° F., hr | 2 | ½ | ½ | (10-12) |
| Scrapes per minute | 12 | 48 | 48 | None |
| Holding time at −100° F. slurry temp., hr | 4 | 4 | ¹ 20 | ² 10 |
| Durene content of cake, weight percent | 48 | 31 | 33 | 52 |
| Yield of 100% durene, weight percent of feed | 4.2 | 4.7 | 5.3 | 5.1 |

¹ Held at −100° F. without stirring.
² Chilling plus holding time equal to about 20 hours.

The results in Table III show that cakes of 31% to 33% of durene were obtained when the feed was chilled at a comparatively rapid rate irrespective of holding time while slower chilling rates with or without stirring of the slurry give higher concentration of durene in the cakes. Crystal yields of durene for similar holding times were about the same regardless of the manner in which the liquid was cooled.

The effect of the holding time on durene yield and concentration was then investigated. Slurries of durene crystals and mother liquor formed from stocks as illustrated in Table II were held for various lengths of time at −100° F. and then centrifuged for 15 minutes employing a rate to impose a force of about 750 times gravity. These results are presented in Table IV.

Table IV

| | | | | | | | |
|---|---|---|---|---|---|---|---|
| Holding time, hr | ¹ 0 | ¹ 1 | ¹ 2 | ¹ 4 | ² 10 | ² 34 | ² 58 |
| Durene content of cake, weight percent | 30 | 33 | 40 | 48 | 52 | 52 | 51 |
| Yield of 100% durene, weight percent of feed | 4.8 | 5.3 | 4.6 | 4.2 | 5.1 | 5.3 | 5.3 |

¹ Chilled in scraped surface chiller at 12 scrapes per minute over about a two-hour period.
² Extremely slow chilling (10-12 hours) without stirring.

It will be seen that in Table IV that holding the slurries at −100° F. for 4 or more hours was necessary to give cakes containing 48% to 50% durene. While the yields for the shorter holding time approached those for the longer period, the durene yields for the shorter period included a comparatively larger amount of durene-containing liquid in the low concentration cakes; whereas with the longer holding time the yields approached the theoretical.

In order to illustrate further the features of the present invention, an aromatic hydrocarbon feed boiling in the range from 350° to 450° F., as illustrated in Table II, was chilled, held at a low temperature of −100° F. and then centrifuged in a basket centrifuge operating at a rate sufficient to impose a force of 750 times gravity. Comparative runs were made wherein the present invention was practiced in which the slurry was warmed prior to centrifuging, and without warming. These data are presented in Table V.

Table V

| Run No. | A | B | C | D | E |
|---|---|---|---|---|---|
| Processing stage | First stage | | | | Second stage, 62% durene feed |
| Holding time at lowest temp., hrs | 72 | 72 | 72 | 2 | ¼ |
| Slurry temp., °F | −100 | −100 | −100 | −20 | +100 |
| Temp. of charge to centrifuge, °F | 1−25 | −100 | −100 | −20 | +100 |
| Centrifuging time, minutes | 10 | 10 | 60 | 10 | 10 |
| Cake Yield, weight percent of feed | 7.4 | 31.6 | 8.2 | 1.1 | 41.4 |
| Durene (100%) yield, weight percent of feed | 4.6 | 6.2 | 4.7 | 0.48 | 39.4 |
| Durene content of cake, weight percent | 61.5 | 19.5 | 58.0 | 43.8 | 95.0 |

[1] The −100° F. slurry was warmed rather rapidly to −25° F. and was immediately charged to the centrifuge.

In the data presented in Table V it will be seen that employing low temperature crystallization followed by selective melting techniques in run A the cake contained 61.5% by weight durene after 10 minutes centrifuging time as compared with 19.5 purity in run B where the cool slurry was not warmed prior to the centrifuging. Without the selective warming technique, 60 minutes centrifuging time was required to reach 58% durene purity as in run C. In run E the cake from run A was melted and recrystallized at 100° F. and then centrifuged to recover a 95% by weight durene.

The effectiveness of the selective melting technique is further illustrated by data on the composition of the slurry feed, cake and filtrate from runs A and B which are presented in Table VI.

Table VI

| | With selective warming | | | Without selective warming | | |
|---|---|---|---|---|---|---|
| Run No. | A | | | B | | |
| Stream | Feed | Cake | Filtrate | Feed | Cake | Filtrate |
| Durene Crystals, weight percent feed | 4.4 | 4.4 | 0 | 4.7 | 4.7 | 0 |
| Durene liquid, weight percent of feed | 5.6 | 0.2 | 5.4 | 5.3 | 1.5 | 3.8 |
| Contaminants, weight percent of feed | 90 | 2.8 | 87.2 | 90 | 25.4 | 64.6 |

It may be noted that the amount of contaminants in the cake in run A with selective warming is very small in comparison with the larger amount in run B without the selective warming technique.

To illustrate the range of temperatures effective in forming the second slurry in accordance with the present invention, runs were made on a feed containing 51% durene, obtained from a first stage operating on a feed such as illustrated in Table II, wherein the slurry temperatures in the second stage ranged from 80° to 105° F. These data are presented in Table VII.

Table VII

| Slurry temperature, °F | +80 | +100 | +105 |
|---|---|---|---|
| Purity of durene concentrate, weight percent | 92 | 94 | 95 |
| Yield of 100% durene, weight percent of feed to the second-stage | 28 | 16 | 12 |

In these runs the durene yields approach the theoretical. It will be seen that at 100° F. slurry temperature a purity of 94% of durene in the cake was obtained.

Since the purity of the first durene cake recovered in the practice of the present invention affects the purity of the final product, a number of runs were made with feeds to the second separation stage which were prepared by cooling melted cakes having varying concentrations of durene to 100° F. to form second slurries. These slurries were centrifuged for 10 minutes at a rate sufficient to impose a force of 750 times gravity on the slurry. The data from these runs are presented in Table VIII.

Table VIII

| Durene concentration in feed, weight percent | 47 | 57 | 62 |
|---|---|---|---|
| Purity of durene concentrate, weight percent | 94 | 94 | 95 |
| Yield of 100% durene, weight percent of feed | 25 | 37 | 39 |

It will be seen from these results that the purity of the recovered durene depends to a large extent on the purity of the first cake recovered in my process and that the higher the concentration of durene in the feed to the second centrifuge the greater the recovery of durene. The feed stock to centrifuge 34 may range from about 47% to about 70% of durene.

In operating in accordance with the mode of the present invention illustrated in connection with the drawing 100 pounds of a feed stock containing 10% by weight of durene is charged into a chiller equivalent to chiller 14, and has its temperature reduced to −100° F. After holding it at −100° F. for the required time, it may be warmed to −25° F. and centrifuged. In this centrifugation operation a mother liquor corresponding to 95.18 pounds containing 5.7% by weight of durene is discharged while the cake is melted and then cooled to 100° F. to form a second slurry which is centrifuged to recover a cake of 95% durene consisting of 4.82 pounds, the recycled filtrate amounting to 6.78 pounds.

In Table II analysis of feed stocks were given which represented the durene and isodurene content as well as the naphthalene content of the feed. These analysis were obtained by spectroscopic methods. While only durene and isodurene are shown prehnitene is also present in the feed stocks.

It is not understood completely why the present invention is effective. However, it is believed that some of the beneficial effects may be explained as follows: Chilling to a low temperature in the range from −95° to −105° F. is required to reduce the solubility of durene sufficiently so that a large yield of crystals may be obtained. The holding time at the low temperature, which has been found necessary, is believed to be required to overcome a supercooling tendency of durene. By holding at the low temperature the durene is given an opportunity to crystallize until the theoretical yield is approached. Furthermore, the crystals are then a relatively large size, so that the separation of the adhering mother liquor in the subsequent separation step is facilitated, and contamination is consequently reduced. However, at this low crystallization temperature the isodurene and prehnitene also crystallize which greatly reduces the effectiveness of centrifuging to recover high purity durene. By quickly warming the chilled slurry from the aforesaid temperature to a temperature from −25° to −75° F. without permitting the durene crystals and adhering liquid to reach equilibrium, it is believed that the lower melting contaminating crystals are selectively melted and are thus thrown into the mother liquor and rejected on centrifuging the slurry. The higher temperature also markedly reduces the viscosity of the mother liquor, thus reducing the centrifuging requirements considerably.

The present invention has advantages over the prior art processes in that wide boiling fractions may be processed to obtain high purity durene, the separation requirements, such as centrifuging, are greatly reduced and capital investment and operating costs are much less than in conventional operations.

The present invention has application to the separation of durene from cracked aromatic fractions boiling in the rang from 350° to 425° F. and those obtained from crude petroleum, catalytic or thermal cracking and from other conversion operations producing aromatic concentrates.

The nature and objects of the present invention having been completely described and illustrated, what I wish to claim as new and useful and to secure by Letters Patent is:

1. A method for recovering durene from an aromatic hydrocarbon feed boiling in the range from 350° F. to 425° F. containing a minor amount of it which comprises chilling the feed to a temperature in the range from −95° F. to −105° F. over a period of time ranging from 4 to 10 hours to form a first slurry in a first mother liquor, maintaining said first slurry at said temperature for a period of time in the range from 4 to 10 hours, warming said first slurry for a time in the range between 15 and 60 minutes to a temperature in the range between −25° F. and −75° F., separating durene crystals from said warmed first slurry to form a first cake containing a substantially greater concentration of durene than said feed, heating and melting said first cake at a temperature in the range between 110° F. and 150° F., cooling said melted cake to a temperature in the range between 80° F. and 105° to form a second slurry of durene crystals in a second mother liquor, separating durene crystals from said second slurry to separate a second cake of durene crystals from said second mother liquor, and recovering substantially pure durene from said second cake.

2. A method in accordance with claim 1 in which durene crystals are separated from said first and second slurries by centrifuging same.

3. A method in accordance with claim 1 in which durene crystals are separated from said first and second slurries by filtering same.

4. A method in accordance with claim 1 in which the separated second mother liquor is recycled and admixed at least in part with the aromatic hydrocarbon feed.

RUFUS B. BENNETT.

References Cited in the file of this patent

UNITED STATES PATENTS

| Number | Name | Date |
|---|---|---|
| 2,511,711 | Hetzner et al. | June 13, 1950 |
| 2,533,232 | Dressler | Dec. 12, 1950 |
| 2,541,682 | Arnold | Feb. 13, 1951 |
| 2,560,373 | Shmidl | July 10, 1951 |

FOREIGN PATENTS

| Number | Country | Date |
|---|---|---|
| 670,474 | Germany | Oct. 5, 1933 |

OTHER REFERENCES

Smith and MacDougall, J. Am. Chem. Soc., vol. 51, page 3001, October 1929.